US012247420B2

(12) United States Patent
Wutte

(10) Patent No.: US 12,247,420 B2
(45) Date of Patent: Mar. 11, 2025

(54) EMERGENCY VEHICLE DOOR OPENING BY HARVESTING ENERGY FROM AN EXTERNAL FIELD

(71) Applicant: STMicroelectronics International N.V., Geneva (CH)

(72) Inventor: Rene Wutte, Sankt Bartholoma (AT)

(73) Assignee: STMicroelectronics International N.V., Geneva (CH)

( * ) Notice: Subject to any disclaimer, the term of this patent is extended or adjusted under 35 U.S.C. 154(b) by 48 days.

(21) Appl. No.: 18/203,159

(22) Filed: May 30, 2023

(65) Prior Publication Data

US 2024/0401379 A1 Dec. 5, 2024

(51) Int. Cl.

*E05B 81/04* (2014.01)
*E05B 77/54* (2014.01)
*E05B 81/16* (2014.01)
*E05B 81/84* (2014.01)

(52) U.S. Cl.

CPC .............. *E05B 77/54* (2013.01); *E05B 81/04* (2013.01); *E05B 81/16* (2013.01); *E05B 81/84* (2013.01)

(58) Field of Classification Search

CPC .......... E05B 81/82; E05B 81/78; E05B 81/77; E05B 2047/0094; B60R 25/403; H04W 12/06

See application file for complete search history.

(56) References Cited

U.S. PATENT DOCUMENTS 10,035,494 B2 7/2018 Sute
10,407,023 B2 9/2019 Elangovan et al.
2012/0108168 A1 5/2012 Metivier
2012/0270496 A1 10/2012 Kuenzi et al.
2014/0293753 A1 10/2014 Pearson
2015/0102904 A1 4/2015 Oh et al.
2018/0154865 A1 6/2018 Bianchi, III et al.
(Continued)

FOREIGN PATENT DOCUMENTS

CA 2929266 A1 7/2016

OTHER PUBLICATIONS

Application Note, "NFC Passive Lock Implementation with NAC1080," Infineon, www.infineon.com/nac1080, Jun. 23, 2022, 38 pgs.
(Continued)

*Primary Examiner* — Toan C To

(74) *Attorney, Agent, or Firm* — Crowe & Dunlevy LLC

(57) ABSTRACT

Described herein is a lock system (e.g., for a vehicle door) including an NFC circuit in communication with a micro-controller that monitors the voltage of a battery (e.g., the vehicle battery). The microcontroller switches the NFC circuit to card emulation (CE) mode with energy harvesting capability when the battery voltage falls below a threshold so that the NFC circuit can harvest energy from a nearby Qi wireless charging field and store that harvested energy in an energy storage device. When the energy storage device is sufficiently charged, it is used power the microcontroller and an electronically actuated mechanical lock (e.g., vehicle door lock), then the microcontroller cooperates with the NFC circuit to switch the NFC circuit to NFC reader mode and attempt to verify a nearby NFC device. If the NFC device is verified, the microcontroller operates the lock, otherwise, it maintains the lock in an inactive state.

17 Claims, 1 Drawing Sheet

(56) References Cited

U.S. PATENT DOCUMENTS

| | | | | |
|---|---|---|---|---|
| 2020/0216030 | A1 | 7/2020 | Craciun | |
| 2021/0237687 | A1* | 8/2021 | Tsuchiya | H04W 4/48 |
| 2022/0194320 | A1* | 6/2022 | Caron | E05B 81/82 |
| 2022/0311280 | A1 | 9/2022 | Mukundala et al. | |
| 2024/0181902 | A1* | 6/2024 | Saito | B60L 53/124 |
| 2024/0271471 | A1* | 8/2024 | Schmitz | E05B 81/86 |
| 2024/0283302 | A1* | 8/2024 | Masuda | H02J 50/10 |

OTHER PUBLICATIONS

EPO Search Report and Written Opinion for priority application, EP Appl. No. 24176343.2, report dated Nov. 13, 2024, 9 pgs.

* cited by examiner

EMERGENCY VEHICLE DOOR OPENING BY HARVESTING ENERGY FROM AN EXTERNAL FIELD

TECHNICAL FIELD

This disclosure relates generally to vehicle door locking systems and, more specifically, to an improved door lock mechanism that addresses the issue of accessing a vehicle with a dead battery while utilizing near-field communication (NFC) technology for unlocking purposes, particularly in cases where there is no backup mechanical lock.

BACKGROUND

In recent years, there has been a growing trend in the automotive industry towards implementing advanced electronic systems to enhance user experience and convenience. One such development is the use of NFC technology for vehicle door access, which has gained popularity as a result of the Connected Car Consortium (CCC) standard. Vehicles conforming to the CCC standard allow users to unlock their car doors by simply bringing their NFC-enabled smartphones or other devices in close proximity to the NFC circuit (NFC reader) integrated into the door lock.

The NFC-based door lock system provides a convenient and secure alternative to traditional mechanical keys or keyless entry systems. However, vehicles following the CCC standard often do not include a backup mechanical lock, making it even more critical to address the issue of accessing the vehicle when the battery is dead. In such cases, the NFC circuit and the electric door lock will not have sufficient power to function, and users will be unable to gain access to their vehicle, potentially leaving them stranded or causing significant inconvenience.

Existing solutions to address this issue typically involve the use of an external power source to jump-start the vehicle. However, accessing the vehicle's battery to provide an external power source can be challenging, as the battery is often located under the hood, which may be locked or difficult to open without access to the vehicle's interior. This requires users to either find a way to manually unlock the hood or resort to unconventional means of accessing the battery, which can be time-consuming, impractical, and potentially damaging to the vehicle.

Therefore, there is a need for an improved vehicle door lock mechanism that retains the convenience and security advantages of an NFC-based system while ensuring that users can access their vehicle even when the battery is dead, particularly in cases where there is no backup mechanical lock. The invention aims to address this need by providing a reliable and practical solution that does not rely on external power sources or mechanical keys, ultimately enhancing the user experience and maintaining the security benefits of the NFC-based locking system.

SUMMARY

Disclosed herein is a vehicle with a battery and an energy storage device that stores less energy than the battery. The vehicle features a door equipped with an electronically actuated mechanical lock and a near field communication (NFC) reader. A microcontroller works in conjunction with the NFC circuit to monitor the battery's voltage and switch the NFC circuit to card emulation (CE) mode, with Qi or NFC energy harvesting capability, when the voltage falls below a predetermined threshold.

The NFC circuit harvests energy from a Qi wireless charging field and store the harvested energy in the energy storage device. When sufficient energy is collected, the microcontroller and electronically actuated mechanical lock are powered by the energy storage device. Once powered, the microcontroller attempts to verify a nearby NFC device, and depending on the verification status, either operates the electronically actuated mechanical lock or maintains it in an inactive state.

In order to verify the nearby NFC device, the microcontroller prompts the NFC circuit to send a request for an encrypted key, which is then verified using a secure element in the verification device. The door of the vehicle may open to either a passenger compartment or a cargo compartment.

Also disclosed herein is a method for operating an electronically actuated mechanical lock. The method involves monitoring the voltage of a battery with a microcontroller unit (MCU) and switching a near field communication (NFC) reader to card emulation (CE) mode when the battery voltage falls below a threshold. Energy is harvested from a Qi wireless charging field using the NFC circuit operating in CE mode and then stored in an energy storage device. The MCU and electronically actuated mechanical lock are powered by the energy storage device when sufficient energy has been harvested and stored.

Once the MCU and electronically actuated mechanical lock are powered, the NFC circuit switches to NFC reader mode and attempts to verify a nearby NFC device. Depending on the verification status of the nearby NFC device, the electronically actuated mechanical lock is either operated or maintained in an inactive state. The verification process involves sending a request for an encrypted key from the NFC circuit to the nearby NFC device, receiving the encrypted key at the NFC circuit, forwarding the key to the MCU, and then passing it to a verification device for validation. The encrypted key is passed from the MCU to a secure element during this process. The method also includes initiating the Qi wireless charging field by a user with a Qi-enabled smartphone.

Also disclosed herein is a lock system that includes an NFC circuit in communication with a microcontroller. The microcontroller is configured to monitor the voltage of a battery associated with the lock system and switch the NFC circuit to card emulation (CE) mode when the battery voltage falls below a threshold. The NFC circuit is configured to harvest energy from a Qi wireless charging field and store the harvested energy in an energy storage device, which is then used to power the microcontroller and electronically actuated mechanical lock.

The microcontroller and the NFC circuit cooperate to switch the NFC circuit to NFC reader mode and attempt to verify a nearby NFC device after the harvested energy has charged the energy storage device above a certain threshold. If the nearby NFC device is verified, the microcontroller operates the electronically actuated mechanical lock, while maintaining it in an inactive state if the device is not verified.

The verification process involves the microcontroller prompting the NFC circuit to send a request for an encrypted key to the nearby NFC device and using a verification device to verify the encrypted key received from the device. The verification device uses a secure element to verify the encrypted key. The microcontroller can be either internal or external to the NFC circuit.

DETAILED DESCRIPTION

Figure 1:
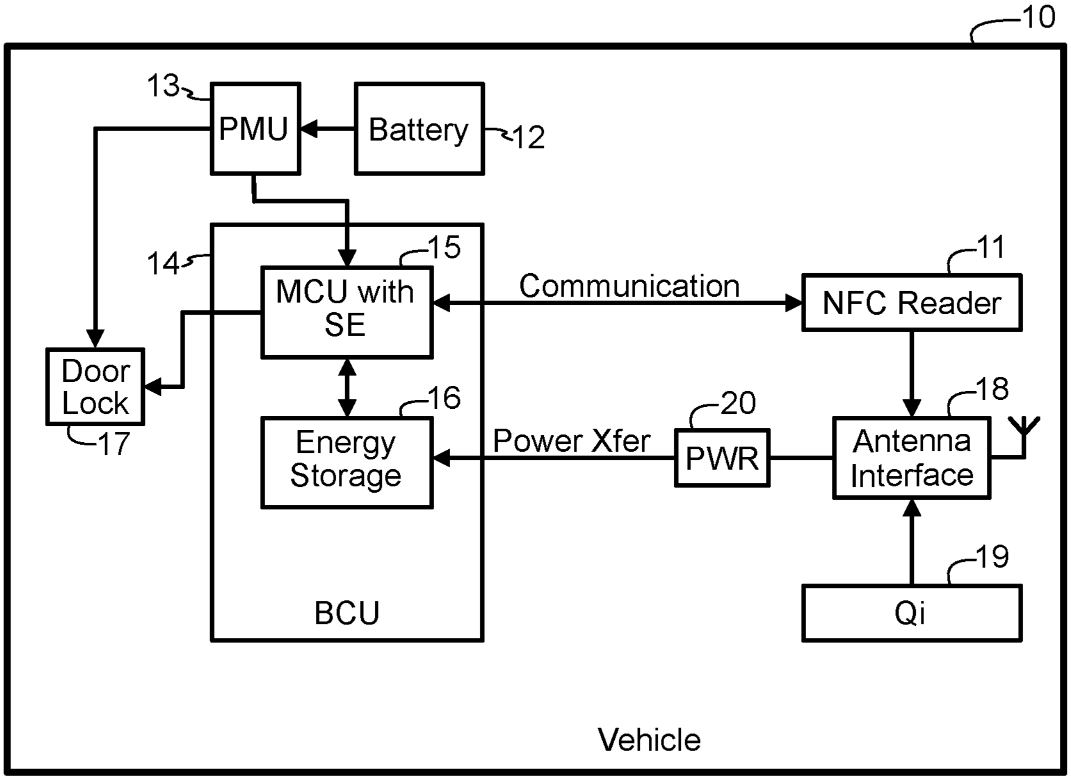
FIG. 1 is a block diagram of a vehicle door lock system described herein.

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Before beginning description of the vehicle door lock system disclosed herein, principles upon which its operation are based will be discussed.

Qi wireless charging technology, a well-established standard for inductive power transfer, operates based on the principle of electromagnetic induction. In this process, a resonant inductive coupling between a sender (a charging station) and a receiver (a mobile device) on a frequency around 125 to 300 kHz is used. The Qi wireless charging standard has been primarily employed for charging devices such as smartphones, tablets, and wearables by placing them in close proximity to a Qi charging pad or transmitter.

Near-field communication (NFC) technology, on the other hand, is primarily used for contactless data exchange between two devices within a short range, typically a few centimeters. NFC operates on a different frequency as Qi wireless charging (13.56 MHz) and uses an inductive coupling mechanism as well.

However, it is still possible for a Qi field to induce power in an NFC device through the higher harmonics present in the Qi signal.

When an alternating current passes through the transmitter coil in a Qi wireless charger, it generates a magnetic field. Although the primary frequency of this field corresponds to the Qi operating frequency, the alternating current can also generate higher harmonics at multiples of the fundamental frequency. The higher harmonics in the Qi signal, especially those that align with the operating frequency of the NFC circuit (13.56 MHz), can induce power in the NFC device.

When an NFC-enabled device is placed within the range of a Qi transmitter, it is possible for the higher harmonics in the Qi field to induce power in the NFC circuit if the device is in card emulation (CE) mode. In CE mode, the NFC circuit acts as a passive NFC tag, allowing the harmonics in the Qi field that align with the NFC frequency to generate an induced voltage in the antenna. This induced voltage can then be utilized to power the NFC circuit and its associated components. This way, the NFC circuit can harvest energy from the Qi field and function even when the primary power source is unavailable, such as when a vehicle's battery is dead.

Further details of the use of an NFC circuit in harvesting energy from a Qi field may be found in European Patent Application Number 23166043.2, the contents of which are incorporated by reference in their entirety.

Recalling the discussion above regarding the issue with vehicles following the CCC standard that lack a backup mechanical lock for their battery-powered, NFC-enabled locks—a dead battery results in no easy way to unlock and open the door. To address this issue, the vehicle door lock system described herein enables the NFC circuit in the door lock to harvest energy from a Qi field, charging an energy storage device to facilitate door unlocking.

Now, referring to FIG. 1, a vehicle door lock system 10 is described. The vehicle door lock system 10 comprises the vehicle's battery 12, which powers an electronic door lock 17 (disposed within the vehicle door) and a body control unit 14 via a power management unit (PMU) 13. The body control unit 14 includes a microcontroller (MCU) 15 with a secure element (SE), TPM (trusted platform module) or similar either integrated therein or associated therewith, and an energy storage device 16, such as a supercapacitor. During normal operation when the battery 12 is charged, the PMU 13 supplies power to the MCU 15 and door lock 17. However, when the battery 12 is dead, the energy storage device 16 powers the MCU 15 and door lock 17.

The system 10 further comprises an NFC circuit 11 (also disposed within the vehicle door, and which may include its own microcontroller performing or facilitating any of the actions of the NFC circuit 11 described hereinbelow) and an optional Qi circuit 19, both coupled to an antenna interface 18, which may include a matching network or a multiplexer that can facilitate the antenna's switching between the Qi circuit 19 and the NFC circuit 11. If present, the matching network is designed to ensure proper impedance matching for the antenna at each relevant operating frequency, optimizing energy transfer and communication performance.

The NFC circuit 11 is configured to support communications and power transfer according to the NFC protocol via the antenna interface 18, and the Qi circuit 19 (if present) is configured to support communications and power transfer according to the Qi protocol via the antenna interface 18.

The antenna interface 18 is coupled to a power management circuit (PWR) 20, which is configured to harvest energy from the signal received by the antenna interface 18. As will be explained below, this energy is stored in the energy storage device 16.

Assuming that both the NFC circuit 11 and Qi circuit 19 are present, the antenna interface 18 is configured to recognize the radio frequency signal received via the antenna. It then determines whether the signal adheres to the protocol of the NFC circuit 11 or the Qi circuit 19, typically by identifying the frequency of the received signal. Upon detecting a signal within the frequency range of the NFC protocol, the antenna interface 18 activates the NFC circuit 11. This leads to the transmission of a return signal and possible initiation wireless charging of the energy storage device 16, per the NFC protocol. Alternatively, if the antenna interface 18 identifies a signal in the frequency range of the Qi protocol, it triggers the Qi circuit 19. This similarly results in the transmission of a return signal and sets up possible wireless charging of the energy storage device 16, this time following the Qi protocol.

The microcontroller (MCU) 15 in the vehicle door lock system controls the operation of the NFC circuit 11 by setting it to either reader mode or CE mode, depending on the battery status. In brief, when the battery 12 is charged, NFC circuit 11 operates in reader mode, reading an NFC key transmitted by a user device (such as an NFC tag or an NFC-equipped smartphone). This key is then verified by the SE or within the MCU 15, and upon successful verification, the electronic door lock 17 is activated to unlock the door. When the battery 12 is dead, if the Qi circuit 19 is not present, the MCU 15 switches the NFC circuit 11 into card emulation (CE) mode to harvest energy from a nearby Qi field produced by the user device; if the Qi circuit 19 is present, the antenna interface 18 detects the nearby Qi field and triggers the Qi circuit 19. Either way, the harvested energy is used by the power management circuit 20 to charge the energy storage device 16, which then powers the MCU 15 and door lock 17.

Figure 2:
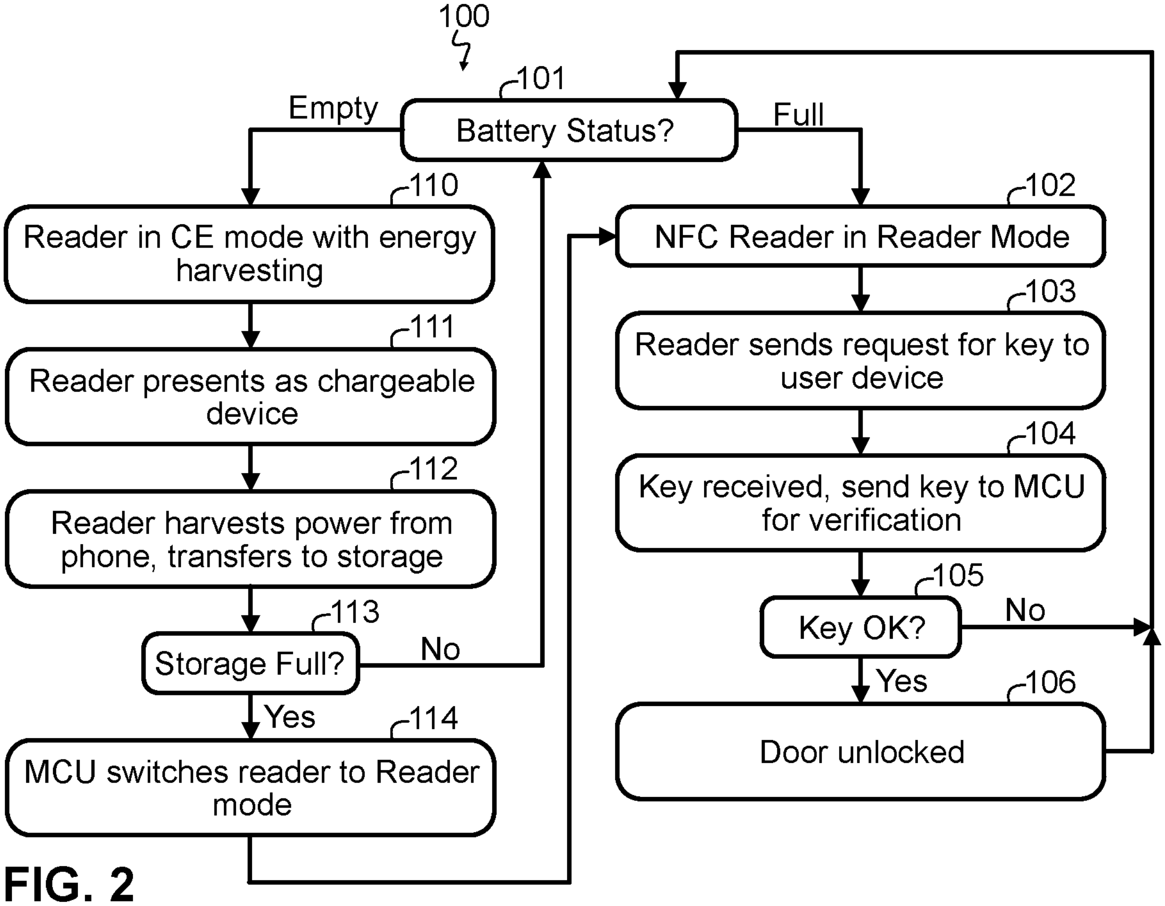
FIG. 2 is a flowchart of operation of the vehicle door lock system of FIG. 1.

Additional details are involved when the NFC circuit 11 is utilized to charge the energy storage device 16. Therefore, the detailed operation of the vehicle door lock system (when the Qi circuit 19 is not present, meaning that the antenna interface 18 maintains the NFC circuit 11 as being active) is now described with reference to the flowchart 100 of FIG. 2. First, the battery status is assessed (Block 101)—the MCU 15 monitors the battery voltage and, if the battery voltage is above a threshold, the MCU 15 maintains the NFC circuit 11 in reader mode (Block 102). When a user's NFC device is brought within range of the NFC circuit 11, the NFC circuit 11 establishes communication with the user's device, and they perform a handshake process, exchanging information for secure communication, such as cryptographic algorithms and session keys (Block 103).

Next, the NFC circuit 11 sends a request to the user's NFC device for an encrypted key, which could be a digital signature or an encrypted message containing authentication data. The user's NFC device generates the encrypted key using its private key (in the case of a digital signature) or a shared secret key (in the case of encrypted authentication data) and sends it back to the NFC circuit 11 (Block 104).

Upon receiving the encrypted key, the NFC circuit 11 forwards it to the MCU 15, which then passes it to the SE. The SE, which has access to the public key or shared secret key, decrypts or verifies the received encrypted key (Block 105). If the decrypted or verified key matches the expected data or signature, the SE signals the MCU 15 that the key is validated. Based on the SE validation status, the MCU 15 activates the door lock 17, allowing the vehicle door to be opened (Block 106). On the other hand, if the key fails to pass validation, the door lock 17 remains inactive, and the vehicle door stays closed.

If the assessment of the battery status (at Block 101) by the MCU 15 is that the battery voltage has fallen below the threshold, the MCU 15 sends a signal to the NFC circuit 11 to switch to CE mode mode (Block 110) to present itself as a chargeable device (Block 111). Alternatively, the NFC circuit 11 could be programmed so that if the NFC circuit 11 is unpowered it will swap to this mode automatically.

The user initiates a Qi wireless charging field by bringing their Qi-enabled device, such as a smartphone with wireless charging capabilities, close to the NFC circuit 11 within the vehicle door. As the NFC circuit 11 operates in CE mode, it cooperates with the power management circuit 20 to capture energy from the higher harmonics present in the Qi field, which align with the operating frequency of the NFC circuit. This harvested energy is then stored in the energy storage device 16 (Block 112). Energy harvesting continues until the energy storage device 16 accumulates sufficient charge (Block 113). During the energy harvesting process, the NFC circuit 11 and/or power management circuit 20 may employ a rectifier and a voltage regulator to convert the harvested AC energy into a stable DC voltage suitable for charging the energy storage device 16. Additionally, an impedance matching circuit may be used to optimize the energy transfer between the Qi field and the NFC circuit 11 and/or power management circuit 20 (Block 112).

Once the energy storage device 16 has gathered enough energy (Block 113), it powers the MCU 15 and the electronic door lock 17, enabling the door unlocking process. The MCU 15 subsequently switches the NFC circuit 11 back to reader mode (Block 102), allowing the user to present their NFC key to the NFC circuit 11. The NFC circuit 11 reads the key and verifies it with the SE or within the MCU 15, as previously described. If the key is successfully verified, the electronic door lock 17 is activated, unlocking the vehicle door (Block 106).

The dynamic mode switching of the NFC circuit 11 between CE mode and reader mode by the MCU 15, as described above, offers several advantages for the vehicle door lock system 10. By ensuring that the NFC circuit 11 operates in the appropriate mode based on the available power, the system maximizes efficiency and helps prevent unnecessary energy waste.

By utilizing the energy harvested from a Qi field to charge the energy storage device 16, the vehicle door lock system 10 provides a reliable and practical solution for unlocking the vehicle door when the battery 12 is dead, particularly for vehicles following the CCC standard that lack a backup mechanical lock. This approach maintains the convenience and security advantages of an NFC-based system while ensuring users can access their vehicle even when the battery is dead.

The integration of Qi wireless charging (via the NFC circuit 11) and NFC communication capabilities also contributes to a seamless user experience. Users can charge their vehicle's door lock system using their Qi-enabled devices, such as smartphones, without the need for additional hardware or cables.

Moreover, the system's flexibility allows for future upgrades and adaptability to new standards and technologies in the fields of wireless charging and secure communication (e.g., if NFC charging is incorporated within mobile devices). As a result, the vehicle door lock system 10 can stay up-to-date with the latest advancements, ensuring continuous convenience and security for users.

Variations of the described system are envisioned, such as integrating a Qi receiving circuit within the vehicle door to charge the energy storage device 16 in addition to the NFC circuit 11. The microcontroller (MCU) can manage the switching between the Qi receiver circuit and the NFC circuit, connecting the appropriate circuit to the antenna based on the current operational mode.

Certainly, modifications and variations to the described system can be made without departing from the scope of this disclosure. In the examples provided, the lock discussed is a door lock, but the same principles can be applied to other locking mechanisms within the vehicle, such as the trunk lock, offering users additional accessibility and convenience.

For instance, the trunk lock could be equipped with an NFC circuit and a Qi energy harvesting system similar to the door lock. This would enable users to unlock the trunk of the vehicle using their NFC devices even when the vehicle battery is dead. By extending this functionality to the trunk lock, users can gain access to essential items stored in the trunk during emergencies or unexpected situations where the vehicle's battery has lost power.

Additionally, the described system could be adapted for other vehicle access points, such as a fuel cap lock or storage compartments on motorcycles and recreational vehicles. This flexibility allows the system to cater to a variety of vehicle types and configurations, enhancing security and user experience across different scenarios.

In addition, the principles of the described system can also be applied beyond vehicles to other secure access applications, such as safes, storage containers, or doors that do not have their own power sources. In these cases, the NFC and Qi energy harvesting technology can be utilized to provide a secure and efficient access solution.

For instance, a safe, storage container, or door could be equipped with an NFC circuit and a Qi energy harvesting system similar to the vehicle door lock. To access the contents of the safe, container, or door, the user would initiate a Qi wireless charging field using their Qi-enabled device, such as a smartphone with wireless charging capabilities. The Qi energy harvesting system in the safe, container, or door would capture energy from the Qi field and store it in an energy storage device within the safe, container, or door.

Once the energy storage device has accumulated sufficient charge, it powers the lock mechanism and the NFC circuit. The user can then present their NFC key to the NFC circuit on the safe, container, or door. The NFC circuit reads the key and verifies it with an embedded security module, similar to the SE within the MCU in the vehicle example. If the key is successfully verified, the lock mechanism is activated, granting access to the contents of the safe, container, or room behind the door.

This approach offers a secure and convenient method for accessing safes, storage containers, and doors without the need for an internal power source or traditional mechanical keys. By leveraging NFC and Qi wireless technology, users can benefit from the added security and flexibility provided by the system, while also ensuring that access is possible even in the absence of a dedicated power source.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A vehicle, comprising:

a battery configured to operate the vehicle;

an energy storage device, the energy storage device storing less energy than the battery;

a door with an electronically actuated mechanical lock and a near field communication (NFC) circuit being disposed in the door; and a microcontroller, wherein the microcontroller and a NFC circuit are configured to cooperate to: monitor a voltage of the battery; and switch the NFC circuit to card emulation (CE) mode with energy harvesting capability when the voltage of the battery has fallen below a threshold;

wherein the NFC circuit is configured to: harvest energy from a Qi wireless charging field and store the harvested energy in the energy storage device such that the microcontroller and electronically actuated mechanical lock are powered by the energy storage device when sufficient energy has been harvested; and wherein the microcontroller, once powered by the energy storage device, is configured to: attempt to verify a nearby NFC device; and in response to verification of the nearby NFC device, operate the electronically actuated mechanical lock, but in response to lack of verification of the nearby NFC device, maintain the electronically actuated mechanical lock in an inactive state.

2. The vehicle of claim 1, wherein the microcontroller attempts to verify the nearby NFC device by: causing the NFC circuit to send a request to the nearby NFC device for an encrypted key; and using a verification device to verify an encrypted key received by the NFC circuit from the nearby NFC device and sent to the microcontroller.

3. The vehicle of claim 2, wherein the verification device is a secure element.

4. The vehicle of claim 1, wherein the door opens to a passenger compartment of the vehicle.

5. The vehicle of claim 1, wherein the door opens to a cargo compartment of the vehicle.

6. A method for operating an electronically actuated mechanical lock, comprising:

monitoring voltage of a battery with a microcontroller unit (MCU);

switching a near field communication (NFC) circuit to card emulation (CE) mode with energy harvesting capability when the voltage of the battery has fallen below a threshold;

harvesting energy from a Qi wireless charging field using a NFC circuit operating in CE mode;

storing the harvested energy in an energy storage device; and powering the MCU and the electronically actuated mechanical lock with the energy storage device when sufficient energy has been harvested and stored.

7. The method of claim 6, further comprising, after powering the MCU and the electronically actuated mechanical lock with the energy storage device, switching the NFC circuit to NFC reader mode and attempting to verify a nearby NFC device.

8. The method of claim 7, further comprising in response to verification of the nearby NFC device, operating the electronically actuated mechanical lock, but in response to lack of verification of the nearby NFC device, maintaining the electronically actuated mechanical lock in an inactive state.

9. The method of claim 7, wherein attempting to verify the nearby NFC device comprises: sending a request from the NFC circuit to the nearby NFC device for an encrypted key; receiving the encrypted key at the NFC circuit from the nearby NFC device; forwarding the encrypted key from the NFC circuit to the MCU; passing the encrypted key from the MCU to a verification device; and verifying the encrypted key.

10. The method of claim 9, wherein passing the encrypted key from the MCU to the verification device comprises passing the encrypted key from the MCU to a secure element.

11. The method of claim 6, further comprising initiating the Qi wireless charging field by a user with a Qi-enabled smartphone.

12. A lock system, comprising:

an NFC circuit in communication with a microcontroller;

wherein the microcontroller is configured to: monitor a voltage of a battery associated with the lock system; and switch the NFC circuit to card emulation (CE) mode with energy harvesting capability when the voltage of the battery has fallen below a threshold;

wherein the NFC circuit is configured to: harvest energy from a Qi wireless charging field; and store the harvested energy in an energy storage device to thereby power the microcontroller and electronically actuated mechanical lock; and wherein the microcontroller and the NFC circuit are configured to cooperate to: switch the NFC circuit to NFC reader mode and attempt to verify a nearby NFC device after the harvested energy has charged the energy storage device above a threshold.

13. The lock system of claim 12, wherein the microcontroller, in response to verification of the nearby NFC device, operates the electronically actuated mechanical lock, but in response to lack of verification of the nearby NFC device, maintains the electronically actuated mechanical lock in an inactive state.

14. The lock system of claim 13, wherein the microcontroller attempts to verify the nearby NFC device by: causing the NFC circuit to send a request to the nearby NFC device for an encrypted key; using a verification device to verify an encrypted key received by the NFC circuit from the nearby NFC device and sent to the microcontroller.

15. The lock system of claim 14, wherein using the verification device to verify the encrypted key comprises using a secure element to verify the encrypted key.

16. The lock system of claim 12, wherein the microcontroller is internal to the NFC circuit.

17. The lock system of claim 12, wherein the microcontroller is external to the NFC circuit.

* * * * *